(12) United States Patent
Wang et al.

(10) Patent No.: US 8,400,763 B2
(45) Date of Patent: Mar. 19, 2013

(54) DISPLAY DEVICE

(75) Inventors: Chung-Min Wang, Hsin-Chu (TW);
Kuan-Chang Shao, Hsin-Chu (TW);
Chien-Fu Chen, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 299 days.

(21) Appl. No.: 12/778,650

(22) Filed: May 12, 2010

(65) Prior Publication Data
US 2010/0328862 A1    Dec. 30, 2010

(30) Foreign Application Priority Data

Jun. 26, 2009 (TW) ................................ 98121525 A

(51) Int. Cl.
*H05K 5/00* (2006.01)
*H05K 7/00* (2006.01)
(52) U.S. Cl. .................................................. 361/679.21
(58) Field of Classification Search .............. 361/679.21
See application file for complete search history.

(56) References Cited

U.S. PATENT DOCUMENTS

| | | | |
|---|---|---|---|
| 6,894,739 B2 * | 5/2005 | Sung et al. ...................... 349/58 |
| 7,061,177 B2 | 6/2006 | Kang et al. | |
| 7,265,967 B2 * | 9/2007 | Chou et al. ............... 361/679.01 |
| 7,652,875 B2 * | 1/2010 | Tsuchida .................. 361/679.21 |
| 2005/0185365 A1 * | 8/2005 | Yamaguchi et al. .......... 361/679 |
| 2006/0018092 A1 * | 1/2006 | Nagano ......................... 361/687 |
| 2009/0129005 A1 * | 5/2009 | Kim et al. ................ 361/679.26 |
| 2009/0147175 A1 | 6/2009 | Tsumura et al. | |
| 2010/0259881 A1 * | 10/2010 | Choi et al. ............... 361/679.21 |

FOREIGN PATENT DOCUMENTS

| | | |
|---|---|---|
| CN | 1459768 | 12/2003 |
| CN | 101452134 | 6/2009 |
| TW | M287959 | 2/2006 |
| TW | I271140 | 1/2007 |
| TW | M334219 U | 6/2008 |
| TW | M350935 U | 2/2009 |

* cited by examiner

*Primary Examiner* — Anthony Haughton
(74) *Attorney, Agent, or Firm* — Muncy, Geissler, Olds & Lowe, PLLC

(57) ABSTRACT

A display device includes a front frame, a panel module, a main back cover, a sub-back cover, a circuit device and a stand set, wherein the main back cover includes a recess portion sinking from the main back cover toward the panel module. An inner space is formed between the recess portion and the sub-back cover. The circuit device is disposed in the inner space and connected to the recess portion. In different embodiments, the display device includes a reinforcing rib for grounding purpose. The reinforcing rib is disposed on the panel module and is located between the panel module and the main back cover. Furthermore, a through-hole is formed on the recess portion for the reinforcing rib to pass through and electrically couples with the circuit device.

11 Claims, 7 Drawing Sheets

DISPLAY DEVICE

BACKGROUND OF THE INVENTION

1. Field of the Invention

This invention relates to a panel display device; especially to a panel display device having a frame made of different materials.

2. Description of the Prior Art

Since the liquid crystal display has become the mainstream of current flat displays, the reduction in thickness, weight and overall production costs has always been the focus of the manufacturer. The weight reduction focuses on reducing the number of elements used or reducing the weight of element used while maintaining the functionality. One approach to achieve this goal is to reduce the use of non-functional elements.

As for liquid crystal displays, the frame thereof uses most of the non-functional materials and thus the weight reduction of conventional liquid crystal display normally starts from reducing the material of frame used in display. For screw holes formed on the frame will be cancelled and impairing the coupling strength between elements of the display device. As it can be seen, one of the bottlenecks of weight reduction is to reduce the number of elements used and weight of elements used while maintaining the overall functionality.

Furthermore, the price of material used for manufacturing frame also affects the overall production cost of liquid crystal display. Furthermore, different materials have different fire resistance, rigidity, and structural strength. Thus one critical issue in reducing the cost of producing liquid crystal display includes manufacturing the frame efficiently based on characteristics and prices of materials.

SUMMARY OF THE INVENTION

It is an object of the present invention to provide a display device having reduced weight because of using less number of elements.

It is another object of the present invention to provide a display device with reduced overall thickness.

It is yet another object of the present invention to provide a display device having a structure with improved resistance toward electromagnetic interference or electrostatic discharge.

The display device of the present invention includes a front frame, a main back frame, a sub-back frame, a panel module, a circuit device and a stand set, wherein the panel module is disposed between the front frame and the main back cover. The main back cover includes a recess portion sink from the surface of the main back cover toward the panel module, to form an inner space. The circuit device is disposed within the inner space and connected to the recess portion. Furthermore, the main back cover and the sub-back cover are different in fire resistance, structural strength, and rigidity. The fire resistance of the sub-back cover is higher than that of the main back cover while the structural strength and rigidity of the main back cover are higher than those of the sub-back cover, but are not limited thereto.

In different embodiments, the display device includes a side frame and a reinforcing rib, wherein the side frame is disposed between the front frame and the main back cover and substantially covers the lateral side of the panel module. The reinforcing rib is preferably disposed at the back side of the panel module. Two ends of the reinforcing rib are preferably connected two opposite sides of the side frame. Furthermore, at least one through hole is formed on the recess portion of the main back cover for a part of the reinforcing rib to pass through and electrically connect with the circuit device. In different embodiments, the reinforcing rib is electrically connected with the circuit device and is used as a ground to improve the susceptibility toward electromagnetic interference and electrostatic discharge of the electrical device and the overall reliability of the display device.

DETAILED DESCRIPTION OF THE PREFERRED EMBODIMENT

The present invention provides a display device, wherein the display device described below includes a liquid crystal panel device, but is not limited thereto; in different embodiments, the display device can include an organic light emitting diode panel device. Furthermore, the display device of the present invention includes a front frame, a main back cover, and a sub-back cover.

Figure 1:
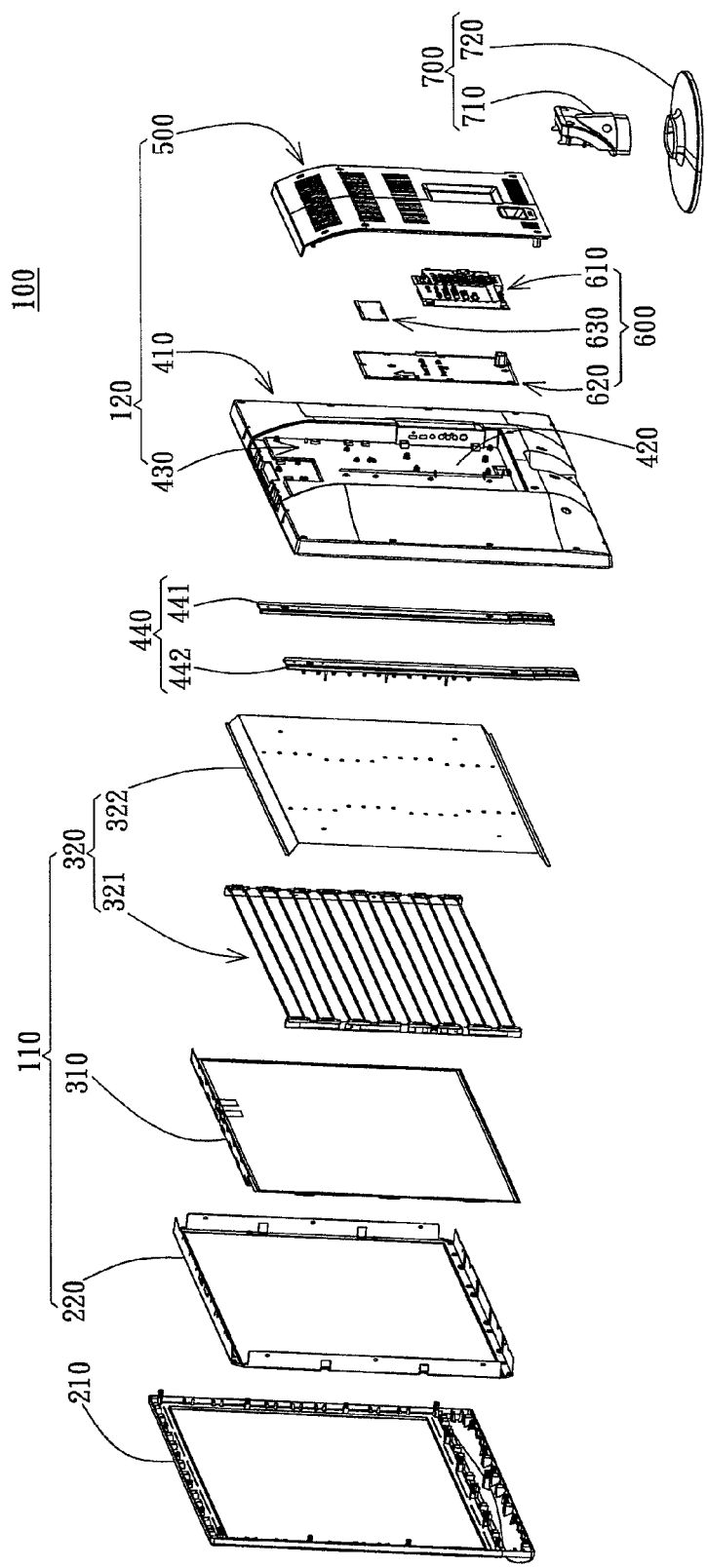
FIG. 1 is an exploded view of the display device of the present invention.

FIG. 1 is an exploded view of the display device 100 of the present invention. As FIG. 1 shows, the display device 100 includes a panel module 110, a back cover set 120, a front frame 210, a circuit device 600, and a stand set 700. The back cover set 120 includes a main back cover 410 and a sub-back cover 500, wherein the panel module 110 is disposed between the front frame 210 and the main back cover 410. The circuit device 600 is disposed between the main back cover 410 and the sub-back cover 500. The stand set 700 of the present embodiment includes a post 710 and a base 720 respectively, wherein two ends of the post 710 are coupled with the main back cover 410 and the base 720. The panel module 110 includes a side frame 220, a display module 310 and a backlight module 320. The display module 310 includes a display panel, a color filter and a polarizer. The backlight module 320 is used to provide light to be processed by the display module 310, wherein the backlight module 320 includes a lamp module 321 and a reflector 322. In the present embodiment, the panel module 110 is a liquid crystal panel module having a backlight module 320, but is not limited thereto; in different embodiments, the panel module 110 includes an organic light emitting diode panel module or other flat panel module.

In the embodiment illustrated in FIG. 1, the side frame 220 is used to protect the panel module 110 by substantially covering the perimeter (e.g. four sides) of the display module 310 and the backlight module 320. In different embodiments, the side frame 220 can be designed to cover two opposite sides or three sides of the panel module 110. The front frame 210 and the side frame 220 each have a corresponding opening, wherein the panel module 110 is exposed through the opening and displays images through the opening. The front frame 210 is coupled with the main back cover 410 to enclose the side frame 220, the display module 310 and the backlight module 320. In the present embodiment, threaded holes are formed on the front frame 210 and the main back cover 410 for fixing elements such as screws to couple the front frame 210 with the main back cover 410, but are not limited thereto; bolts or other suitable elements can be used to couple the front frame 210 with the main back cover 410.

In the embodiment illustrated in FIG. 1, the display device 100 further includes a reinforcing rib 440 disposed at the back side of the panel module 110. In other words, the reinforcing rib 440 is disposed on the side of the panel module 110 facing the backlight module 320. The reinforcing rib 440 of the present embodiment is used to increase the overall strength of the display device 100 and especially the tolerance of the display device against stress. Furthermore, the reinforcing rib 440 is preferably fixed on the side frame 220 to fix the display module 310 and the backlight module 320 between the side frame 220 and reinforcing rib 440. The reinforcing rib 440 of the present embodiment extends along the back of the panel module 110, wherein two ends of the reinforcing rib 440 are preferably connected to two opposite sides of the side frame 220. Furthermore, the reinforcing ribs 440 are preferably parallel and connected to the side frame 220, but are not limited thereto; the reinforcing rib 440 can cross each other to connect with the side frame 220 instead of being parallel with each other. The display device 100 can include any suitable number of reinforcing ribs 440. In the present embodiment, the reinforcing rib 440 is preferably made of metallic material with electrical conductivity, but is not limited thereto; in different embodiments, the reinforcing rib 440 can be made of plastics or other suitable materials.

Figure 2:
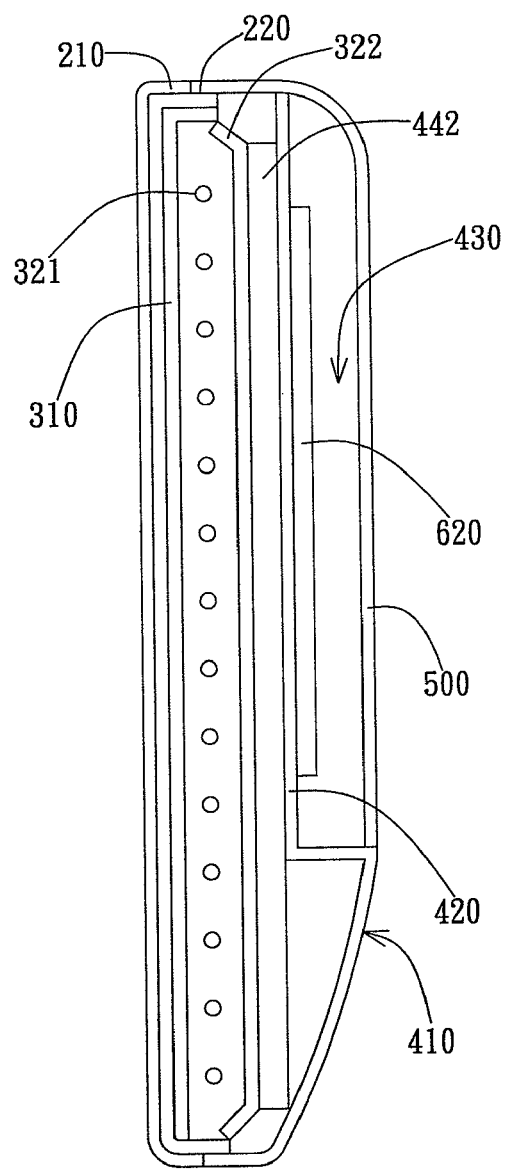
FIG. 2 is a cross-sectional view of the display device of the present invention.

Please refer to FIG. 1 and FIG. 2, wherein FIG. 2 is a cross-sectional view of the display device of the present invention. As FIG. 2 shows, the main back cover 410 includes a recess portion 420, wherein the recess portion 420 sinks from the main back cover 410 towards the panel module 110. In other words, an inner space is formed between the recess portion 420 and the sub-back cover 500. The recess portion 420 of the present embodiment is located close to the centre of the main back cover 410 and extends along the longer side of the main back cover 410. The recess portion 420 includes a rectangular bottom, but is not limited thereto; the recess portion 420 can have square or other suitable shapes depending on design requirements. In the present embodiment, the circuit device 600 includes a first circuit board 610, a second circuit board 620 and a third circuit board 630. However, only the second circuit board 620 is illustrated in FIG. 2. In the embodiment illustrated in FIG. 2, the second circuit board 620 is disposed within the inner space 430 and is attached to the bottom surface of the recess portion 420. Furthermore, after the display device 100 is assembled, the sub-back cover 500 will substantially completely cover the inner space 430, the first circuit board 610, the second circuit board 620 and the third circuit board 630 in order to protect the circuit device 600 from potential damages. Furthermore, as FIG. 2 shows, even if the sub-back cover 500 is disposed over the recess portion 420 and covering the recess portion 420. The use of the sub-back cover 500 will not increase the overall thickness of the main back cover 410. As it can be seen, by placing the first circuit board 610, the second circuit board 620 and the third circuit board 630 in the inner space 430 between the recess portion 420 and the sub-back cover 500, the inner space 430 reduces the overall thickness required for accommodating the circuit boards 610, 620 and 630.

In the embodiment illustrated in FIG. 1 and FIG. 2, the main back cover 410 and the sub-back cover 500 are made of different plastic materials, wherein the materials of the two back covers have different characteristics and functionality. In the present embodiment, the main back cover 410 is made of high impact Polystyrene and the sub-back cover 500 is made of Acrylonitrile Butadiene Styrene, but is not limited thereto. The main back cover 410 and the sub-back cover 500 can be made of other suitable materials. Furthermore, the main back cover 410 and the sub-back cover 500 can include fire retardants having different fire resistances. In the present embodiment, the structural strength and rigidity of the main back cover 410 are higher than those of the sub-back cover 500 because the main back cover 410 is mainly responsible for the overall structural strength of the display device. On the other hand, the fire resistance of the sub-back cover 500 is greater than that of the main back cover 410 and therefore is used to protect the circuit device 600 from extreme temperature, fire or other threats.

As FIG. 1 and FIG. 2 show, the circuit device 600 is disposed within the inner space 430 between the main back cover 410 and the sub-back cover 500. The circuit device 600 of the present embodiment is a printed circuit board assembly (PCBA) which is used to accept and process external power source for the panel module 110, but is not limited thereto. The circuit device 600 may include a processor or other electronic circuit for processing electrical signal.

Figure 3:
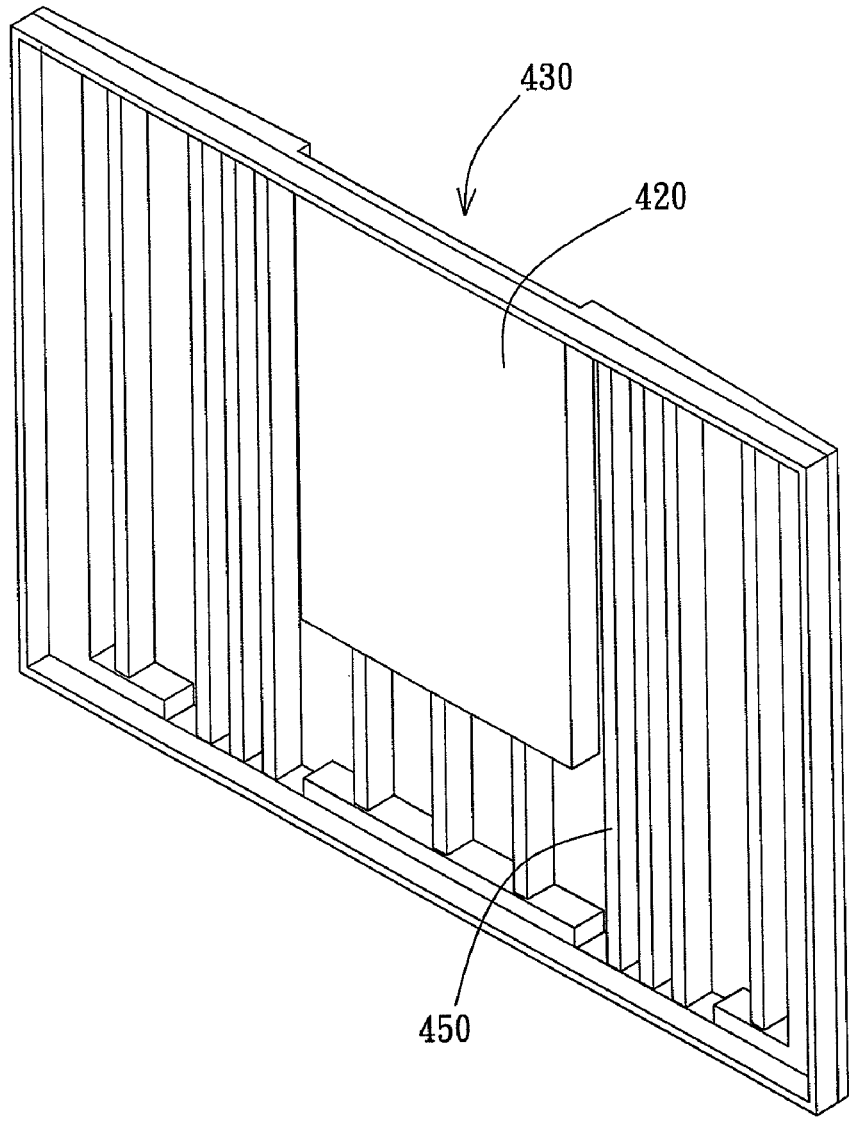
FIG. 3 is another schematic view of the main back cover of the present invention, wherein a plurality of reinforcing ribs are disposed on the main back cover.

FIG. 3 is a schematic view of the main back cover 410 of the present invention. As FIG. 3 shows, the main back cover 410 includes a plurality of supporting protrusions 450 formed on the surface of the main back cover 410 opposite to the recess portion 420. The supporting protrusions 450 are disposed adjacent to the recess portion 420 and are preferably horizontally or vertically parallel with each other to increase the stress tolerance of the main back cover 410. In the present embodiment, the supporting protrusion 450 extends from a longer side of the main back cover 410 to the opposite longer side, but is not limited thereto. The supporting protrusion 450 may extend from a shorter side of the main back cover 410 toward the opposite shorter side or the recess portion 420. In different embodiments, the main back cover 410 can have a combination of the above-mentioned supporting protrusions 450, including two sets of supporting protrusions 450 extending from the longer side and the shorter side, respectively.

Figure 4:
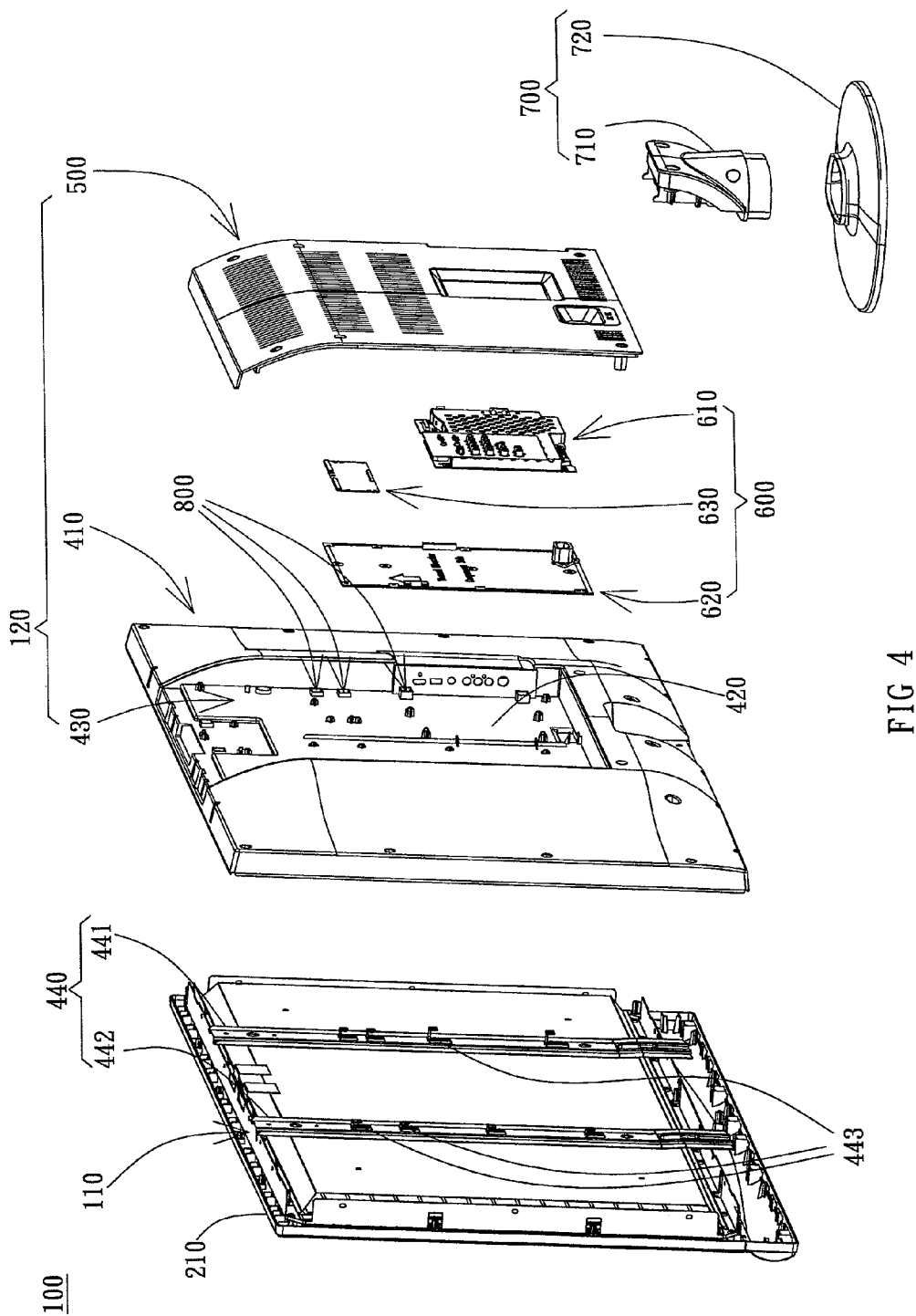
FIG. 4 illustrates an exploded view of another embodiment of the display device.
Figure 5:
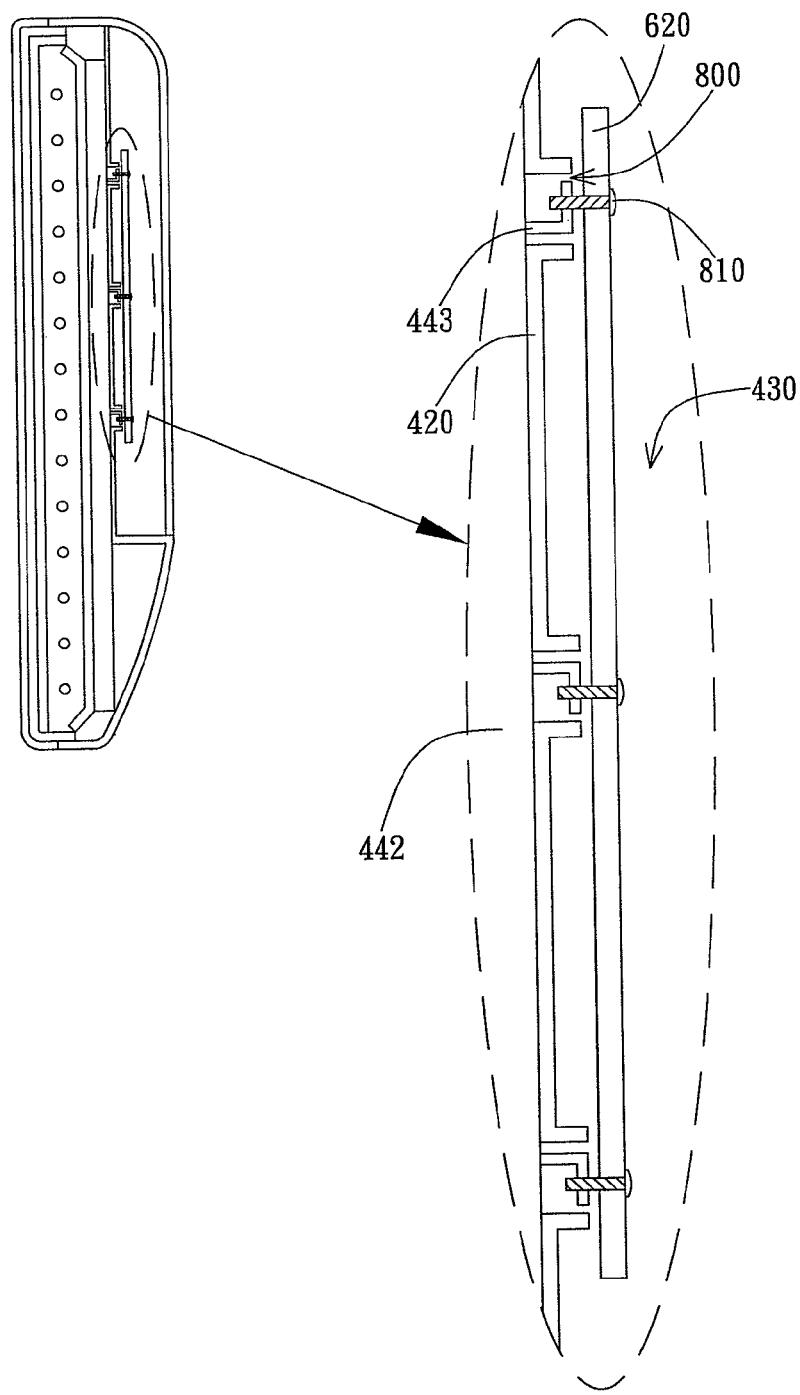
FIG. 5 illustrates a cross-sectional view of the display device illustrated in FIG. 4.

FIG. 4 is an exploded view of another embodiment of the display device 100 of the present invention. FIG. 5 is a cross-sectional view of the display device 100 illustrated in FIG. 4. As FIG. 4 shows, the first reinforcing rib 441 and the second reinforcing rib 442 include a plurality of connectors 443, wherein the connector 443 faces the main back cover 410. A plurality of through holes 800 corresponding to the connectors 443 are disposed on the recess portion 420 for the connectors 443 to pass and connect with the circuit device 600. In this way, the circuit device 600 is connected to both the reinforcing rib 440 and the surface of the recess portion 420. As FIG. 5 shows, the through hole 800 is formed on the recess portion 420 of the main back cover 410 for the inner space 430 to communicate with the space between the panel module 110 and the main back cover 410. Furthermore, the connector 443 of the reinforcing rib 440 passes through the through hole 800 and connects with the circuit device 600. In the embodiment illustrated in FIG. 5, corresponding screw holes are formed on the circuit device 600 and the connectors 443 for a screw 810 or other connecting elements to pass through and couple the connector 443 and the circuit device 600. In this way, the screw 810 also electrically couples the connector 443 with the circuit device 600, but is not limited thereto; in different embodiments, the circuit device 600 can be connected to the connector 443 using other types of elements or methods.

In the embodiment illustrated in FIG. 4 and FIG. 5, the connector 443 forms a connection tab which has a hook shape, but is not limited thereto; in different embodiments, the connector 443 can have a disk shape, a cylindrical shape or other forms that can pass through the through hole and electrically connects with the circuit device 600. Furthermore, as FIG. 4 shows, the through hole 800 is a square hole, but is not limited thereto; in different embodiments, the through hole 800 can have a circuit shape or other shapes corresponding to the dimension of the connector 443. Furthermore, the length of the connector 443 can be modified according to the length of the through hole 800 and the screw 810 or the connecting elements. In the present embodiment, the connector 443 of the reinforcing rib 440 provides a ground and electrical connections to the panel module 110. The circuit device 600 is electrically connected to the connector 443 via screws or other elements and is provided with a ground. In other words, the reinforcing rib 440 provides the circuitry of the display device 100 including the circuit device 600 with an identical voltage. Furthermore, the ground provided by the reinforcing rib 440 improves susceptibility toward electromagnetic interference or static discharge of the circuit device 600 and the overall reliability of the display device 100. Furthermore, in addition to the ground functionality, the first reinforcing rib 441 and the second reinforcing rib 442 also increases the overall structural strength of the display device 100. Thus the first reinforcing rib 441 and the second reinforcing 442 are used to replace the conventional back brazel or other elements used implicitly to increase the structural strength of the display device 100. As it can be seen, the reinforcing ribs 441, 442 reduce the number of elements used as well as the overall weight of the display device 100.

Figure 6:
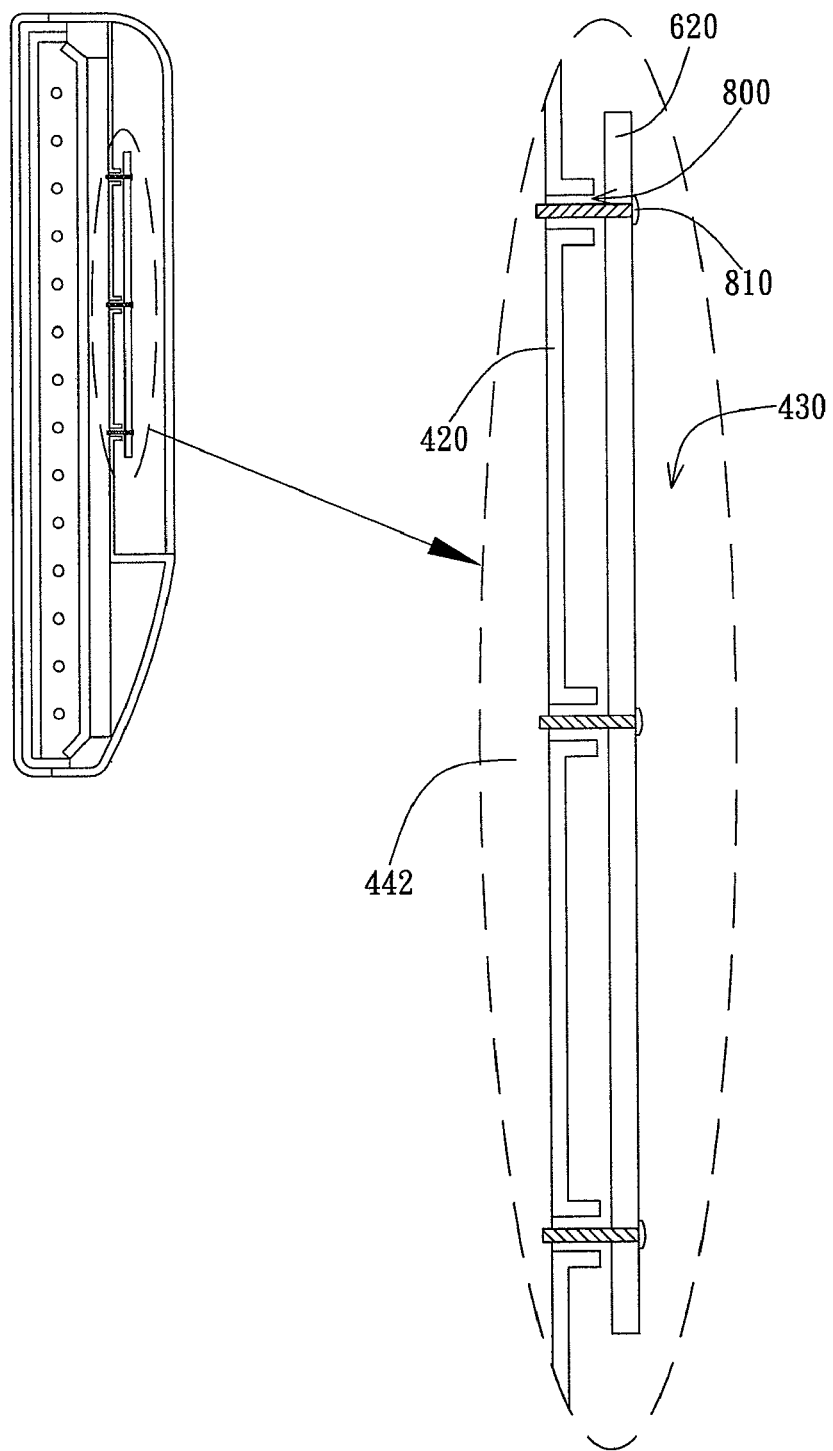
FIG. 6 is a cross-sectional view illustrating another embodiment of the display device illustrated in FIG. 5.

FIG. 6 is a cross-sectional view illustrating another embodiment of the display device 100. Screw holes (not illustrated) and through holes 800 are formed on the reinforcing ribs 440 and the circuit device 600. A connecting element 810 for passing through the screw aperture and through holes 800 is disposed on the circuit device 600 to couple the circuit device 600 with the reinforcing rib 440. The connecting element 810 illustrated in FIG. 6 is a screw having electrical conductivity, but is not limited thereto; in different embodiment, a tab-like connector as illustrated in FIG. 5 can be disposed on the circuit device 600 for passing through the through hole and electrically coupling the circuit device 600 with the reinforcing ribs 440.

Figure 7:
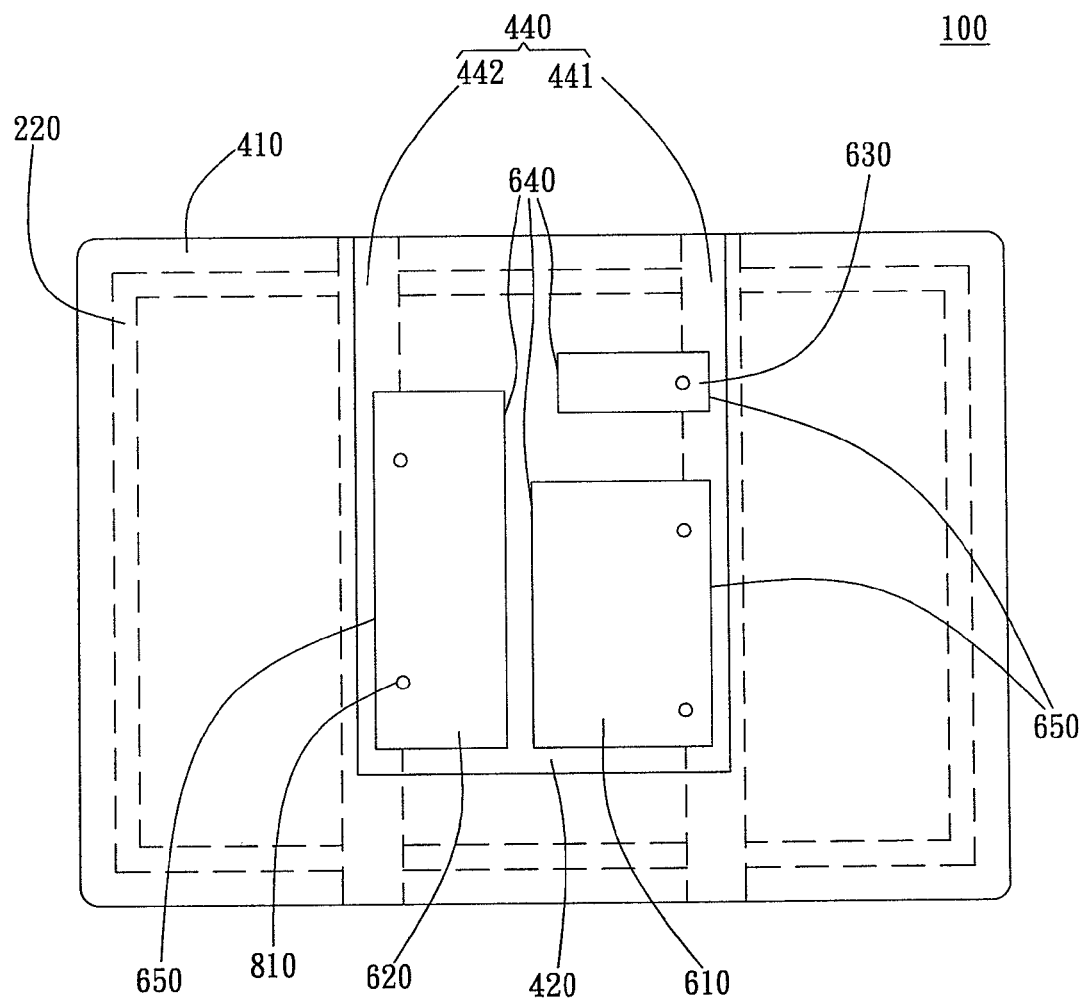
FIG. 7 is a back view of the display device of FIG. 5.

FIG. 7 is a back view of the display device of in FIG. 5, wherein the sub-back cover is not illustrated. The circuit device includes a first circuit board 610, a second circuit board 620 and a third circuit board 630. The reinforcing ribs 440 further includes a first reinforcing rib 441 and a second reinforcing rib 442, wherein the first reinforcing rib 441 and the second reinforcing rib 442 are disposed at locations corresponding to two opposite sides of the recess portion 420 of the main back cover. In other words, the width of the recess portion is substantially the distance between the first reinforcing rib 441 and the second reinforcing rib 442 or the distance that the recess portion 420 spans between the first reinforcing rib 441 and the second reinforcing rib 442. As it can be seen, the circuit device 600, the recess portion 420 and the reinforcing rib 440 at least partly overlap to allow the connecting element 810 to pass through the through hole (not illustrated) on the recess portion 420 to electrically connect to the reinforcing ribs 440.

Furthermore, as FIG. 7 shows, each of the first circuit board 610, the second circuit board 620, and the third circuit board 630 has a first side 640 and a second side 650. The first sides 640 of the first circuit board 610, the second circuit board 620 and the third circuit board 630 are substantially connected to the recess portion 420 of the main back cover 410. The second sides 650 of the first circuit board 610, the second circuit board 620, and the third circuit board 630 are electrically connected to the reinforcing ribs 440. The first side 640 of the circuit board extends from one reinforcing rib toward the other reinforcing rib, but is not limited thereto; in different embodiments, the first sides 640 of the circuit boards 610, 620 and 630 can extend toward the side frame 220.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A display device, comprising:
a front frame;
a panel module having an active area and a back side, wherein the active area faces the front frame;
a main back cover corresponding to the back side of the panel module, the panel module being disposed between the front frame and the main back cover, wherein the main back cover has a recess portion recessing from a surface of the main back cover toward the panel module to form an inner space, wherein the recess portion has a bottom and a side wall connecting the bottom and the surface of the main back cover;
a circuit device disposed within the inner space and on the bottom of the recess portion so that the circuit device and the panel module are disposed on two opposite sides of the main back cover; and
a sub-back cover corresponding to the recess portion and covering the inner space to cover the circuit device, wherein the sub-back cover exposes part of the main back cover other than the recess portion.

2. The display device of claim 1, further comprising:
a side frame enclosing the lateral side of the panel module and disposed between the front frame and the main back cover; and
at least one reinforcing rib, disposed across the back side of the panel module, having two ends connected to two opposite sides of the side frame, respectively.

3. The display device of claim 2, wherein the circuit device passes through the recess portion of the main back cover to connect with the reinforcing rib.

4. The display device of claim 3, wherein the recess portion of the main back cover has a through hole in communication with the inner space, the reinforcing rib has a connector extending through the through hole to connect with the circuit device.

5. The display device of claim 4, wherein the connector has a connecting tab.

6. The display device of claim 3, wherein the circuit device has a first side and a second side opposite to each other, the first side is connected to the recess portion and the second side passes through the recess portion to connect with the reinforcing rib.

7. The display device of claim 2, wherein the reinforcing rib includes a first rib and a second rib, the recess portion spans across the first rib and the second rib.

8. The display device of claim 1, wherein a fire-resistance of the sub-back cover is higher than a fire-resistance of the main back cover.

9. The display device of claim 1, wherein a structural strength of the main back cover is greater than a structural strength of the sub-back cover.

10. The display device of claim 9, wherein a rigidity of the main back cover is greater than a rigidity of the sub-back cover.

11. The display device of claim 1, wherein a plurality of supporting protrusions are formed on one side of the main back cover facing the panel module, the supporting protrusions are formed around the recess portion.

* * * * *